G. LANGBEIN.
LEAF OR POCKET FOR FLY BOOKS.
APPLICATION FILED DEC. 27, 1912.
1,076,894.
Patented Oct. 28, 1913.
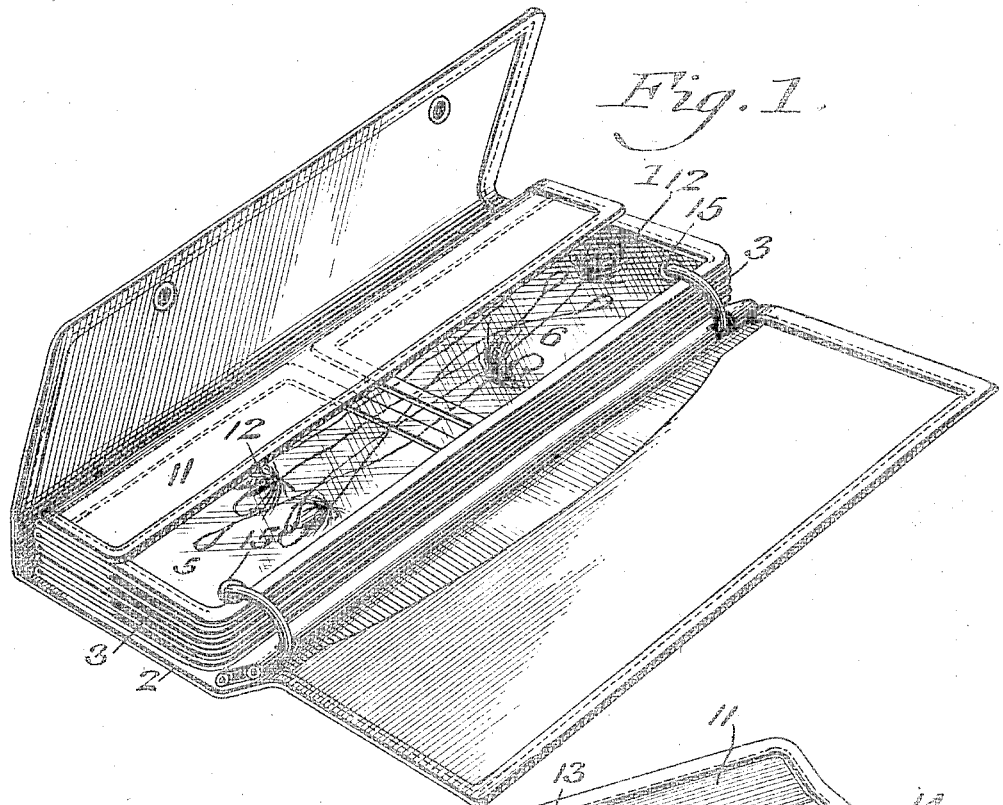
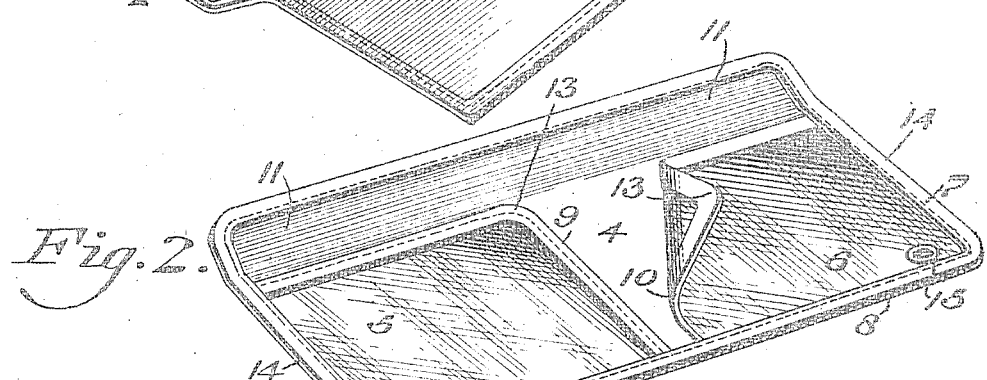
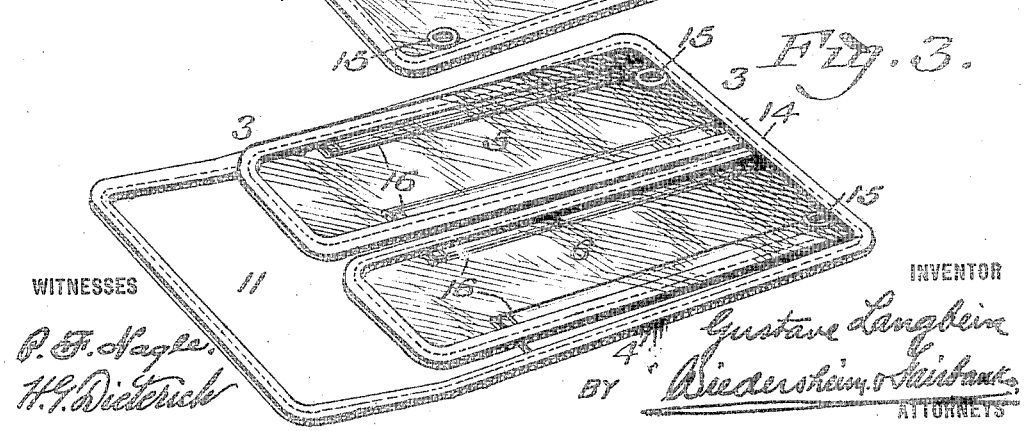

UNITED STATES PATENT OFFICE.

GUSTAVE LANGBEIN, OF PHILADELPHIA, PENNSYLVANIA, ASSIGNOR TO F. W. KLINGER & LANGBEIN CO., OF PHILADELPHIA, PENNSYLVANIA, A CORPORATION OF PENNSYLVANIA.

LEAF OR POCKET FOR FLY-BOOKS.

1,076,894.  Specification of Letters Patent.  Patented Oct. 28, 1913.

Application filed December 27, 1912. Serial No. 738,921.

*To all whom it may concern:*

Be it known that I, GUSTAVE LANGBEIN, a citizen of the United States, residing in the city and county of Philadelphia, State of Pennsylvania, have invented a new and useful Leaf or Pocket for Fly-Books, of which the following is a specification.

My invention relates to a new and useful fly book and consists of a leaf having a back and two front sections suitably connected thereto with their adjacent edges movable with respect to said back and independently of each other.

It further consists of other novel features of construction all as will be hereinafter fully set forth.

For the purpose of illustrating my invention I have shown in the accompanying drawing one form thereof which is at present preferred by me since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a fly book in open position, showing a plurality of the leaves in position. Fig. 2 represents a perspective view of one of the leaves in detached position. Fig. 3 represents a perspective view of another form of leaf.

Similar numerals of reference indicate corresponding parts in the figures.

Referring to the drawings: 1 designates a fly book having a cover 2 and a plurality of leaves or pockets removably connected in any suitable manner with said cover which latter is also provided with a suitable means for holding the book in closed position.

The leaves 3 are formed of a back 4 of any suitable material and connected therewith are the two front sections 5 and 6 which are, preferably, of any transparent material.

In the form shown in Figs. 1 and 2 the front sections are secured to the back along the edges 7 and 8, whereby the outer edges thereof are free as well and the respective adjacent or opposed edges 9 and 10, which latter are thus movable with respect to the back and independently of each other. It will be noted that the said adjacent edges 9 and 10 are slightly spaced apart although this may not be necessary in every instance. I preferably provide a flap or closure 11, on the back 4, which closure is adapted to be inturned over the free edges of the front sections 5 and 6 which flap serves to hold the said free edges and serves as a closure for the pocket or pockets formed between the back and the front sections, so that by turning out the flap, access to the pockets may be had and by reason of the two free edges of the front sections the fingers of the user may be easily inserted into the pockets, forcing out the free portions of the front flaps, so that a fly 12 may be selected and removed, or any number thereof, while the insertion of the same into the pockets is facilitated. It will be understood that by this construction the corners 13 of the front sections may be bent out, as seen in Fig. 2, for ease of access to the contents of the pockets.

I preferably desire to provide a binding 14 of any suitable material for the edges of the back and front sections and to secure the same thereto by stitching or otherwise.

I desire to secure the leaves in the book in any suitable manner and have here shown, as one way, the eyelets 15 carried by the leaves, for the reception of any securing means. It will be understood, however, that the leaves may be used independently of the book in which event the eyelets will be unnecessary.

In the construction shown in Fig. 3, I have shown the back 4 and the front sections 5 and 6. Between the side edges and the front sections and the back I place the bellows or folds 16 which are suitably secured thereto in order to provide for movement of the free ends of the front sections. The bellows 16 preferably terminate a suitable distance from the free edges of the front sections in order that these portions thereof may be bent back. The back 4 is provided with the flap 11 for holding the free edges and also to serve as the closure as previously described.

It will now be seen that I have provided a structure which is simple in construction but which enables the user to have access to the contents of the pockets.

Having thus described my invention, what

I claim as new and desire to secure by Letters Patent, is:

1. In a leaf or pocket, a back, and a front, the latter being formed of separate sections, each section movable with respect to the back independently of each other and being secured to the back for a portion of its extent, whereby the other portion of each section is free and the free portions of each section can be curled back independently of each other.

2. In a leaf or pocket, a back, and a front, the latter being formed of separate sections, each section movable with respect to the back independently of each other and being secured for a part of its edge to said back, each with its top edge and a suitable portion of its adjacent edge free from said back, and the adjacent edges suitably separated, said front sections being formed of suitable transparent material.

3. In a leaf or pocket, a back, and a front, the latter being formed of separate substantially rectangular sections, each section being secured along two sides thereof, to the back, whereby the other two sides of each section are free and the free portions of each section can be curled back independently of each other.

4. In a leaf or pocket, a back, and a front, the latter being formed of separate sections, each section being secured along two edges thereof to said back, each with its top edge and its adjacent edge free from said back, and the adjacent edges suitably separated, said front sections being formed of suitable transparent material.

5. In a leaf or pocket, a back, and a front, the latter being formed of separate sections, each section being secured along two edges thereof to said back, with its top edge and its adjacent edge free and with the adjacent edges suitably separated, said front sections being formed of suitable transparent material, and a flap movably carried by said back and adapted to be inturned over the ends of said front sections, to hold the free edges thereof and to close the pockets formed between the said front sections and said back.

GUSTAVE LANGBEIN.

Witnesses:
C. D. McVay,
F. A. Newton.